US012289582B2

(12) United States Patent
Hesselballe

(10) Patent No.: US 12,289,582 B2
(45) Date of Patent: Apr. 29, 2025

(54) ANTENNA FOR A HEARING ASSISTANCE DEVICE

(71) Applicant: Widex A/S, Lynge (DK)

(72) Inventor: Jan Hesselballe, Soeborg (DK)

(73) Assignee: Widex A/S, Lynge (DK)

( * ) Notice: Subject to any disclaimer, the term of this patent is extended or adjusted under 35 U.S.C. 154(b) by 153 days.

(21) Appl. No.: 17/801,978

(22) PCT Filed: Feb. 16, 2021

(86) PCT No.: PCT/EP2021/053769
§ 371 (c)(1),
(2) Date: Aug. 24, 2022

(87) PCT Pub. No.: WO2021/170454
PCT Pub. Date: Sep. 2, 2021

(65) Prior Publication Data

US 2023/0133627 A1 May 4, 2023

Related U.S. Application Data

(60) Provisional application No. 62/981,145, filed on Feb. 25, 2020.

(51) Int. Cl.
*H04R 25/00* (2006.01)
*H01Q 1/27* (2006.01)
(Continued)

(52) U.S. Cl.
CPC ........... *H04R 25/609* (2019.05); *H01Q 1/273* (2013.01); *H01Q 7/00* (2013.01); *H01Q 9/26* (2013.01);
(Continued)

(58) Field of Classification Search
CPC .............. H04R 25/554; H04R 2225/51; H04R 25/609; H04R 25/505; H01Q 1/273; H01Q 1/243; H01Q 1/245; H01Q 7/00
See application file for complete search history.

(56) References Cited

U.S. PATENT DOCUMENTS 6,342,861 B1 * 1/2002 Packard .................. H01Q 3/02 343/834
2012/0087506 A1 * 4/2012 Ozden ...................... H01Q 9/42 455/90.3

(Continued)

FOREIGN PATENT DOCUMENTS

DE 102017220187 * 11/2017
DE 10 2017 220187 A1 11/2018
EP 3 471 198 A1 4/2019

OTHER PUBLICATIONS

International Search Report of PCT/EP2021/053769 dated May 14, 2021 [PCT/ISA/210].

(Continued)

*Primary Examiner* — Norman Yu
(74) *Attorney, Agent, or Firm* — Sughrue Mion, PLLC

(57) ABSTRACT

A hearing assistance device comprises a housing component (32, 33) enclosing processing circuitry arranged in a compact block structure (20), at least one actively driven antenna element (23, 24) arranged in between the compact block structure (20) and the housing component (32, 33), and a parasitic element (25, 26) integrated in the housing component (32, 33) and extending along at least a part of the at least one actively driven antenna element (23, 24). The parasitic element (25, 26) is electrically isolated from the at least one actively driven antenna element (23, 24).

17 Claims, 4 Drawing Sheets

(51) Int. Cl.
*H01Q 7/00* (2006.01)
*H01Q 9/26* (2006.01)

(52) U.S. Cl.
CPC ....... *H04R 25/554* (2013.01); *H04R 2225/51* (2013.01)

(56) References Cited

U.S. PATENT DOCUMENTS

| | | | | |
|---|---|---|---|---|
| 2012/0093324 | A1* | 4/2012 | Sinasi | H04R 25/552 381/322 |
| 2015/0016645 | A1* | 1/2015 | Bauman | H04R 25/554 381/315 |
| 2019/0261100 | A1* | 8/2019 | Troelsen | H04R 25/60 |
| 2019/0372209 | A1* | 12/2019 | Wong | H01Q 1/38 |

OTHER PUBLICATIONS

Written Opinion of PCT/EP2021/053769 dated May 14, 2021 [PCT/ISA/237].

* cited by examiner

ANTENNA FOR A HEARING ASSISTANCE DEVICE

The present invention relates to an antenna for a hearing assistance device. The invention, more particularly, relates to a hearing assistance device having a housing component enclosing processing circuitry arranged in a compact block structure, and at least one actively driven antenna element arranged in between the compact block structure and the housing component. Also, the invention relates to a method of manufacturing such a hearing assistance device.

The purpose of the invention is to provide a hearing assistance device with an antenna element adapted for a compact design of the hearing assistance device.

This purpose is achieved according to the teaching of claim 1. By using a parasitic element as claimed, the parasitic element can be used for shaping the radiation pattern and/or improving bandwidth properties. Thereby improved properties for the hearing aid antenna may be obtained despite the limited volume available in the hearing aid.

According to a second aspect of the invention, there is provided a method of manufacturing a hearing assistance device according to claim 14. The dependent claims define various embodiments.

The invention will be described in further detail with reference to preferred aspects and the accompanying drawing, in which.

DETAILED DESCRIPTION

Figure 1:
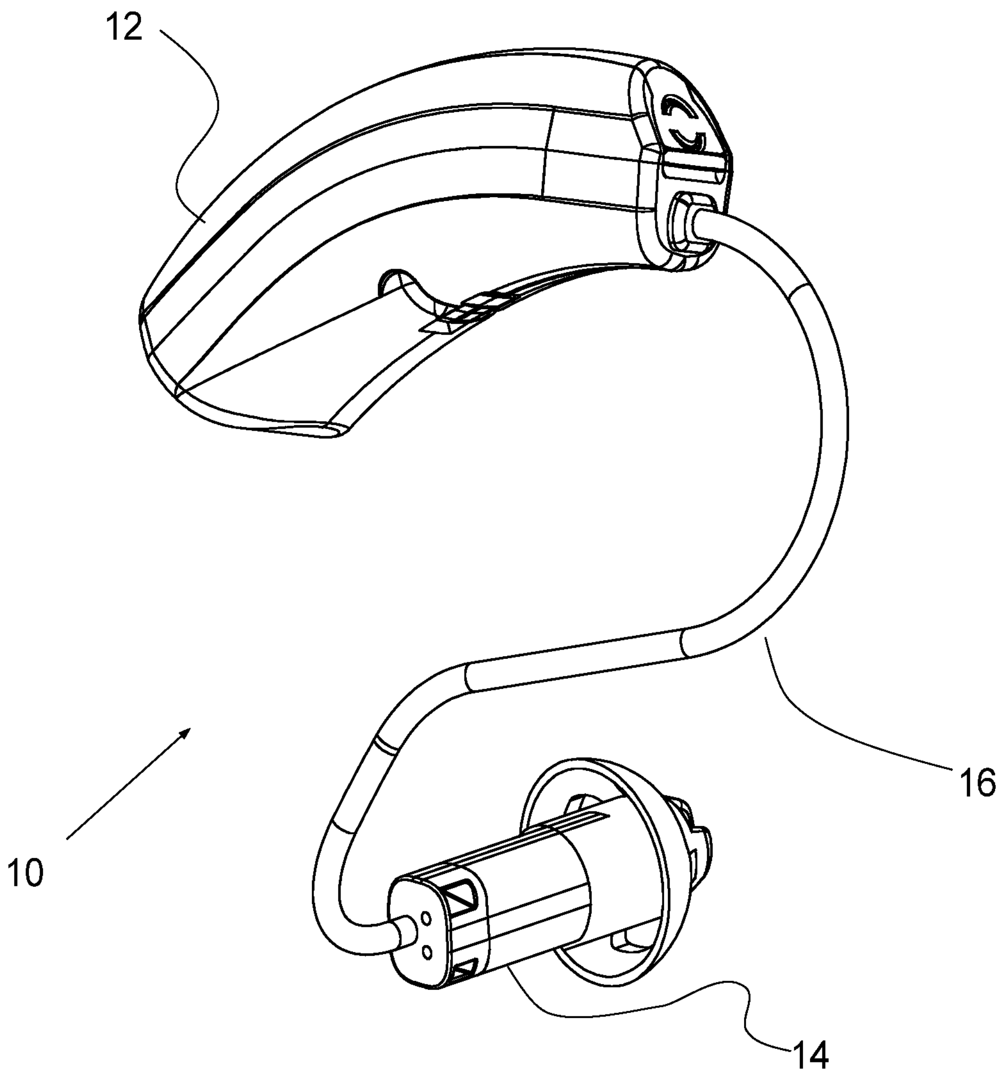
FIG. 1 shows a hearing assistive device according to one embodiment of the invention.

A hearing assistive device is according to one embodiment of the invention a hearing aid 10 and is shown in FIG. 1. The hearing aid 10 comprises a Behind-The-Ear (BTE) housing component 12 adapted for placement Behind-The-Ear (BTE), and to which there is attached an earpiece component 14. The major part of the electronics (including some microphones, a processor, a battery and preferably a short-range radio, e.g. Bluetooth based, and an inductive radio) of the hearing aid 10 is located inside of the housing component 12.

In one embodiment, the sound producing parts of the hearing aid 10 (including a speaker) are located inside of the earpiece component 14. The housing component 12 and the earpiece component 14 are interconnected by a cable 16 comprising two or more wires (not shown) for transferring audio processed in the housing component 12 to the speaker in the earpiece component 14, for powering components in the earpiece component 14, and/or for transferring audio picked up by a microphone (not shown) in the earpiece component 14 to the audio processing components in the housing component 12.

In one embodiment, the sound producing parts of the hearing aid 10 (including a speaker) are located inside of the housing component 12. The housing component 12 and the earpiece component 14 are interconnected by a sound tube (not shown) for passing sound produced by the speaker in the housing component 12 to an outlet in the earpiece component 14.

Figure 2:
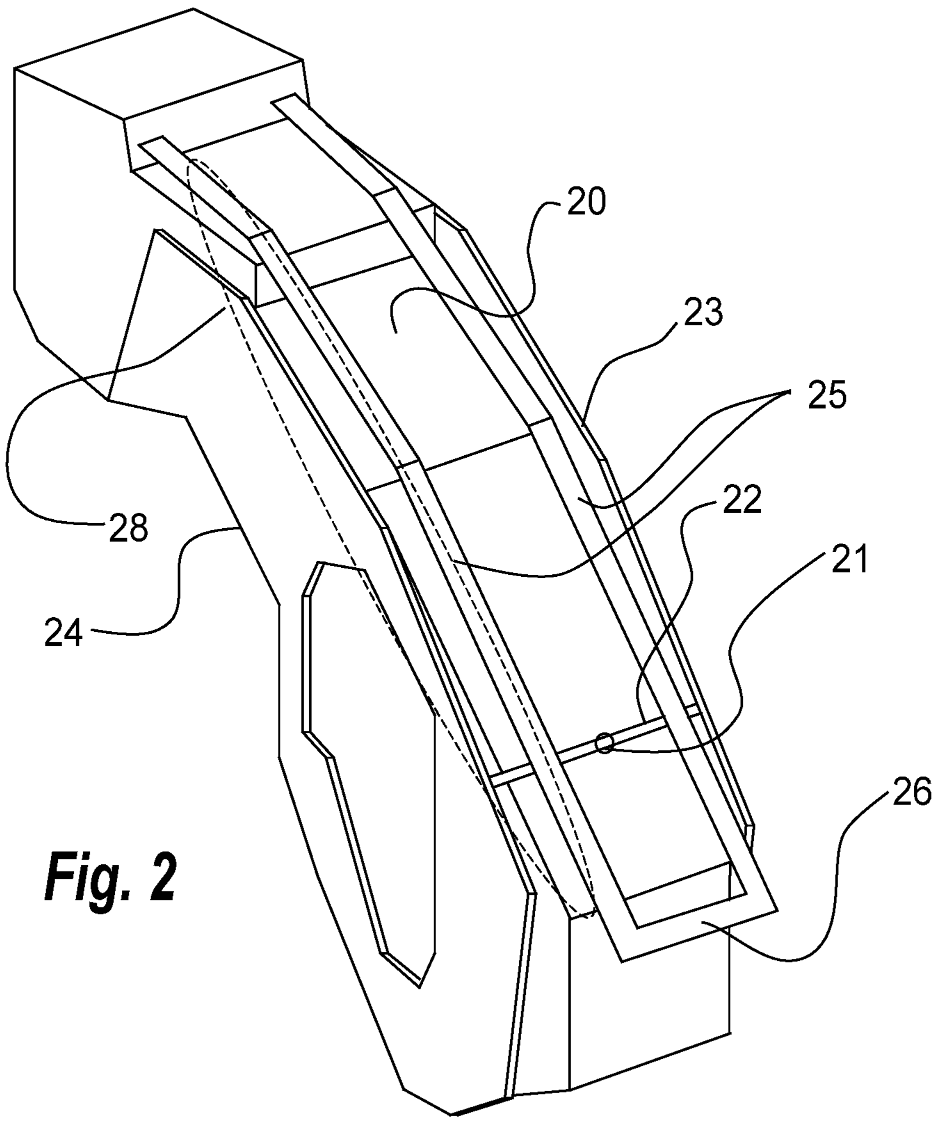
FIG. 2 illustrates schematically one embodiment of a compact block structure of a hearing aid with actively driven antenna elements and a parasitic element according to the invention.

FIG. 2 illustrates schematically one embodiment of a compact block structure 20 of a hearing aid with two actively driven antenna elements 23 and 24 and a parasitic element 25, 26 according to the invention. In one embodiment, each of the two actively driven antenna elements 23 and 24 are resonant loop antennas governed by the intended wavelength of operation. For a loop antenna intended to operate in the ISM band at approximately 2.4 GHz, the wavelength will be around 12.5 cm.

The loop antenna can be viewed as a folded dipole split into an open shape, just as a folded dipole is a full-sized loop, bent at two ends and squashed into a line. The shape of loop antenna is in fact a closed polygon limited by the shape of the hearing aid housing 12. It is only required that its perimeter is slightly over one full wavelength. An antenna feed 21 drives, via a feed line 22, the two antenna elements 23 and 24.

The hearing aid according to the invention comprises, in addition to the actively driven antenna elements 23 and 24, a passive radiator or parasitic element 25, 26 which is a conductive element. The parasitic element 25, 26 is not electrically connected to anything else. The actively driven antenna elements 23 and 24 are connected to the radio transceiver (receiver and transmitter) through a feed line, while the parasitic element 25, 26 is not. The parasitic element 25, 26 is in one embodiment a metal rod.

The purpose of the parasitic element 25, 26 is to modify the radiation pattern of the radio waves emitted by the actively driven antenna elements 23 and 24. The modification of the radiation pattern of the radio waves may involve increasing the antenna's directivity (gain). Normally parasitic elements are used for increasing the bandwidth of the actively driven antenna element, but for hearing aids the parasitic element 25, 26 can be used for shaping the radiation pattern and thereby obtain improved properties for the hearing aid antenna despite the limited volume available in the hearing aid.

The parasitic element 25, 26 is acting as a passive resonator absorbing the radio waves from the nearby driven antenna elements 23 and 24 and re-radiating radio waves with a different phase. The radio waves from the actively driven antenna elements 23 and 24 and the parasitic element 25, 26 interfere and is strengthening the entire antenna's radiation in the desired direction and cancelling out the waves in undesired directions.

The parasitic element 25, 26 in the hearing aid antenna according to the embodiment illustrated in FIG. 2 is mounted parallel to the driven antenna elements 23 and 24, with all the elements in a line substantially perpendicular to the direction of radiation of the entire antenna. The way the parasitic element 25, 26 affects the radiation pattern depends both on the parasitic element's separation from the actively driven antenna element, and on the length of the parasitic element.

The driven antenna element is in one embodiment equivalent to a half-wave dipole. Therefore, the driven antenna element has a length being half a wavelength of the radio waves used. By applying appropriate matching components, including a capacitor and an inductor, it is possible to shorten the physical length of the two branches and obtain the desired electric length. The matching components may be used for antenna tuning.

According to the invention, two types of parasitic elements are used, a reflector and a director. A "reflector" is slightly longer (around 5%) than a half-wavelength. It serves to reflect the radio waves in the opposite direction. A "director" is slightly shorter than a half-wavelength; it serves to increase the radiation in directions defined by the actual design.

According to the antenna illustrated in FIG. 2, it is seen that parasitic element 25, 26 is a director (folded di-pole) arranged in the top of a well-known hearing aid antenna design and is extending along this antenna. The parasitic element 25, 26 has two main segments 25 extending in parallel with each other and a bridge segment 26 connecting the two main segments 25. The two driven antenna elements 23 and 24 do each have an upper edge along which one of the two main segments 25 of the parasitic element extends.

When designing the overall antenna system, it is important to identify areas of the one or more driven antenna elements 23 and 24 transporting a significant current compared to other parts of the one or more driven antenna elements 23 and 24. These areas will often provide a significant contribution of the radiation from the antenna. When coupling the one or more driven antenna elements 23 and 24 to the parasitic element 25, 26, the coupling may advantageously take place along edge transporting a significant current.

In the embodiment shown in FIG. 2, the driven antenna elements 23, 24 and the parasitic element 25, 26 are coupled by mutual inductance. Mutual inductance occurs in the illustrated embodiment in a section 28 when the change in current in one inductor induces a voltage in another nearby inductor. In the illustrated embodiment, the spacing between the upper edge of one of the actively driven active elements 23 and 24 and one of the two main segments 25 of the parasitic element may in the mutual inductance section 28 be in the range from 0.5 to 5% of the wavelength at which the antenna resonates. In one embodiment, the spacing will be below 2% of the wavelength. The spacing between the upper edge of one of the actively driven active elements 23 and 24 and a respective one of the two main segments 25 of the parasitic element must be sufficiently low to ensure that mutual inductance occurs between the two parts.

Referring to FIG. 2, the mutual inductance section 28, in which the upper edge of one of the actively driven active elements 23 and 24 and a respective one of the two main segments 25 of the parasitic element are sufficiently close to ensure that mutual inductance, extends along a significant part of the each of the two main segments 25. Each of the actively driven active elements 23 and 24 interacts with respective main segments 25 of the parasitic element in respective mutual inductance sections 28 (only one is shown). In one embodiment, the length of the mutual inductance section 28 may be in the range from 8 to 25% of the wavelength at which the antenna resonates.

In the mutual inductance section 28, the spacing between the upper edge of one of the actively driven active elements 23 and 24 and a respective one of the two main segments 25 of the parasitic element may vary, and for shorter segments exceed the range given above, but the accumulated length range fulfilling the spacing range must be in the range from 8 to 25% of the wavelength at which the antenna resonates.

The bridge segment 26 of the parasitic element provides an electrical connection main segments 25 of the parasitic element. In some embodiments that bridge segment 26, may be connected to a flex print in the compact block structure 20, and thereby grounded.

In one embodiment, the parasitic element according to the invention is not rod-shaped, a parasitic microstrip patch antenna can mounted above a driven patch antenna. This antenna combination resonates at a slightly lower frequency than the original element. However, the main effect is to greatly increase the impedance bandwidth (up to 10 times) of the antenna.

According to the invention, the parasitic elements are not electrically connected to the transmitter or receiver, and serve as passive radiators, re-radiating the radio waves to modify the radiation pattern. The directors are slightly shorter than the driven element, while the reflector(s) are slightly longer.

In many applications for use of passive elements for shaping the radiation pattern of an actively driven active antenna element, the spacings between the actively driven active element and passive elements vary from about 10 to 25% of a wavelength, depending on the specific design. However, according to one embodiment of the present invention, the spacings between the actively driven active element and passive elements used in a hearing aid will be just around 1 mm (0.8% of a wavelength) for an antenna operating according to the Bluetooth™ specification in the globally unlicensed (but not unregulated) industrial, scientific and medical (ISM) short-range radio frequency band at 2.4 GHz. The wavelength in free air at 2.4 GHz will be around 12.5 cm. The spacing between the actively driven active element and passive elements may in one embodiment vary from about 0.5 to 5% of a wavelength. In one embodiment of the invention, the minimum spacing between the actively driven active element and passive elements is below 2% of a wavelength. In some embodiments the actively driven active element and a passive element is separated by an insulating material. In some embodiments the passive element is embedded in a plastic wall of the hearing aid housing.

Figure 3:
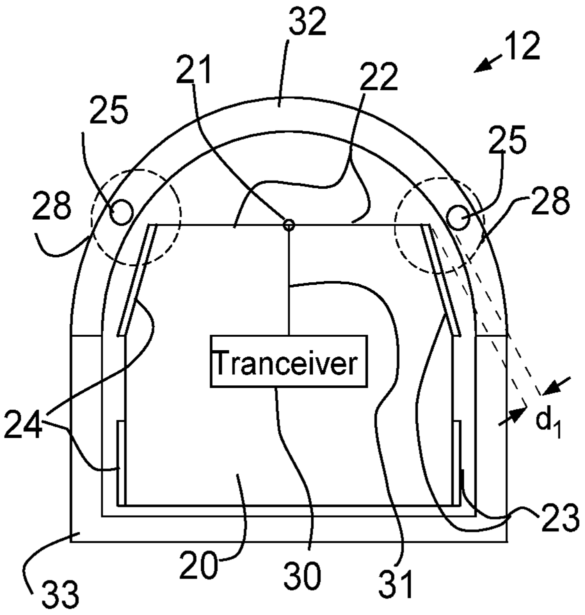
FIG. 3 illustrates in cross section one embodiment of a compact block structure of a hear aid with actively driven antenna elements and a parasitic element according to the invention.

FIG. 3 illustrates in cross section of a compact block structure 20 of a hear aid 10 with actively driven antenna elements 23 and 24 and a parasitic element 25, 26 according to one embodiment of the invention. The compact block structure 20 hosts a transceiver 30 outputting and receiving radio signals via the two actively driven antenna elements 23 and 24. The transceiver 30 is via a feed line 31 connected to the antenna feed 21, acting as a branching point, and further via the feed line 22, provided as metalized lanes on the compact block structure 20, to the two actively driven antenna elements 23 and 24. The two actively driven antenna elements 23 and 24 are in this embodiment provided as loop antennas. The housing component 12 comprises a top housing part 32 and a bottom housing part 33.

The two main segments 25 of the parasitic element are embedded into the top housing part 32. The parasitic element 25, 26 is provided by embedding a U-shape metal rod into the top housing part 32 during the manufacturing. The U-shaped metal rod may be over-molded or insert-molded in an injection molding process for integrating the parasitic element 25, 26 into the top housing part 32. In the mutual inductance section 28, the spacing between the upper edge of one of the actively driven active elements 23 and 24 and one of the two main segments 25 is marked as $d_1$ and will be in the range from 0.5 to 5% of the wavelength at which the antenna resonates.

Hereby it is easily ensured that the parasitic element 25, 26 in FIG. 3 is not electrically connected to the two actively driven antenna elements 23 and 24.

Figure 4:
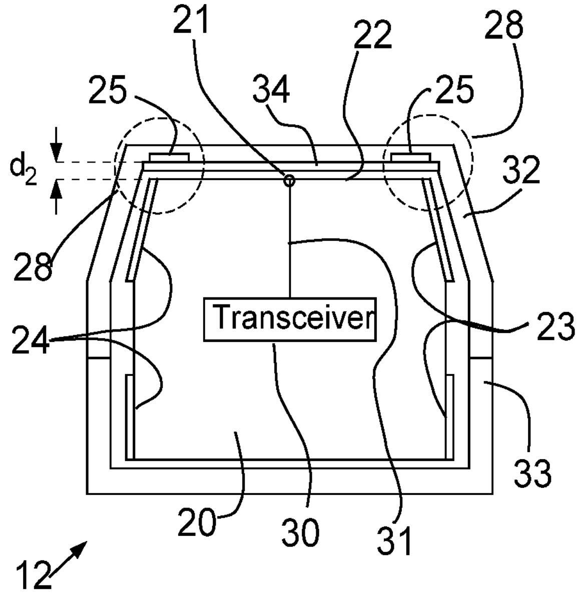
FIG. 4 illustrates in cross section another embodiment of a compact block structure of a hear aid with actively driven antenna elements and a parasitic element according to the invention.

FIG. 4 also illustrates in cross section of a compact block structure 20 of a hear aid 10 with actively driven antenna elements 23 and 24 and a parasitic element 25, 26 according to one embodiment of the invention. The transceiver 30 operates as described with reference to FIG. 3. The two actively driven antenna elements 23 and 24 are provided as loop antennas. The housing component 12 comprises a top housing part 32 and a bottom housing part 33.

The two main segments 25 of the parasitic element are embedded into the top housing part 32 as metallic path's or lanes during the manufacturing. The U-shaped parasitic element 25, 26 is manufactured by adding a metallic pattern to housing component in a Laser Direct Structuring (LDS) process. The metallic pattern is in one embodiment provided on the inner surface of the top housing part 32, and subsequently covered by an insulating layer 34, e.g. an insulating foil.

The LDS process is based on a thermoplastic material doped with a (non-conductive) metallic inorganic compound. The metallic inorganic compound is activated by means of laser. The top housing part 32 is injection molded in a single shot (single-component injection molding), with almost no limitation in the design freedom. A laser then selectively exposes the course of the later circuit trace on the top housing part 32 with a laser beam.

Where the laser beam hits the plastic, the metal additive forms a micro-rough track. The metal particles of this track afterwards form the nuclei for a subsequent metallization. In an electroless copper bath, the conductor path layers arise precisely on these tracks. Successively layers of copper, nickel and gold finish can be raised in this way.

In the mutual inductance section 28, the spacing between the upper edge of one of the actively driven active elements 23 and 24 and one of the two main segments 25 is marked as $d_2$ and will be in the range from 0.5 to 5% of the wavelength at which the antenna resonates.

Hereby it is easily ensured that the parasitic element 25, 26 in FIG. 4 is not electrically connected to the two actively driven antenna elements 23 and 24.

Figure 5:
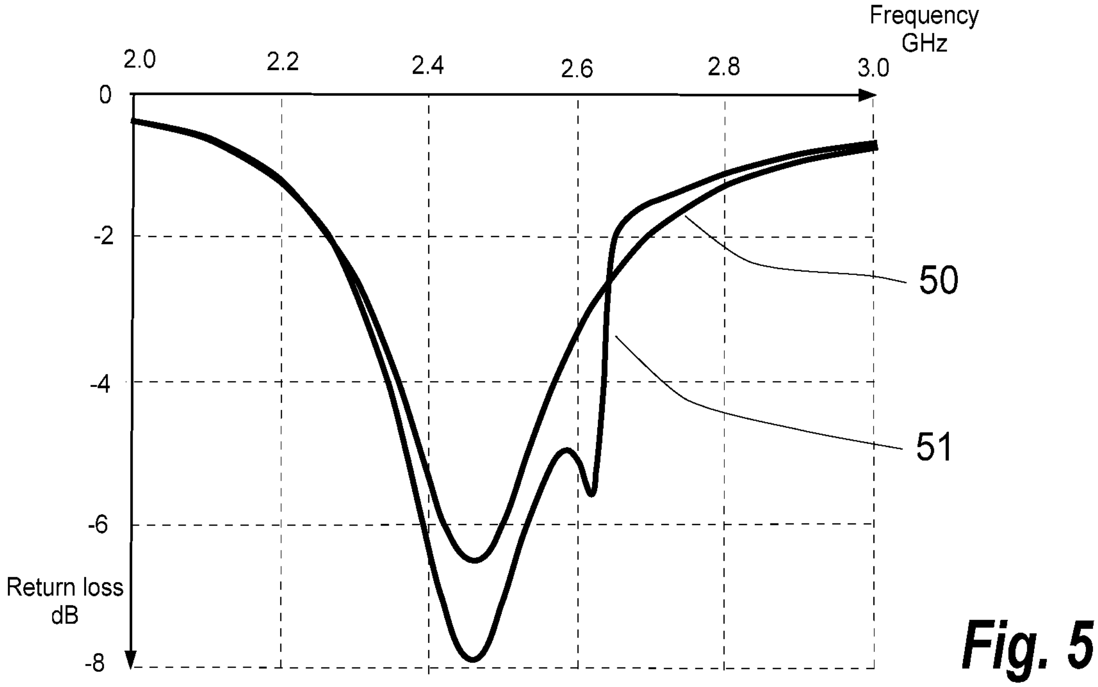
FIG. 5 illustrates the return loss for the compact block structure of a hear aid with actively driven antenna elements and with and without a parasitic element according to the invention.

FIG. 5 illustrates the return loss for the compact block structure 20 of a hear aid 10 with actively driven antenna elements 23 and 24. The curve 50 represents the compact block structure 20 shown in FIG. 2 with the two actively driven antenna elements 23 and 24 without the parasitic element 25, 26. The curve 51 represents the compact block structure 20 shown in FIG. 2 with the two actively driven antenna elements 23 and 24 with the parasitic element 25, 26 according to the invention. It is seen that the return loss, in the interesting frequency band between 2.4 and 2.5 GHz, has been increased with more than 1.5 dB.

The return Loss for an antenna indicates the proportion of radio waves (in transmit mode) arriving at the antenna input that are rejected as a ratio against those that are accepted. A high return loss means more power into the antenna. Furthermore, an improvement of the total antenna efficiency in the interesting frequency band between 2.4 and 2.5 GHz, has been increased with more than 0.5 dB. The antenna efficiency is a measure of the electrical efficiency with which a radio antenna converts the radio-frequency power accepted at its terminals into radiated power.

Figure 6:
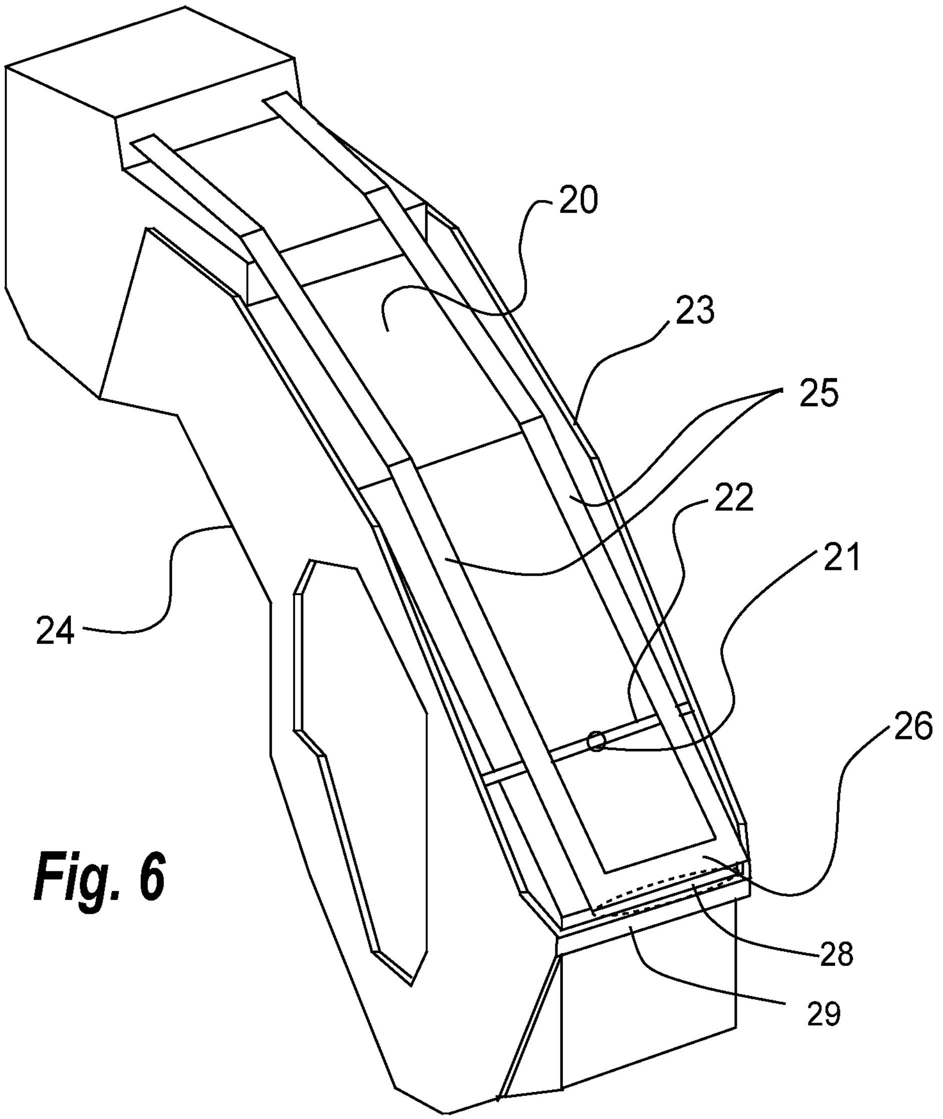
FIG. 6 illustrates schematically a second embodiment of a compact block structure of a hearing aid with actively driven antenna elements and a parasitic element according to the invention.

FIG. 6 illustrates schematically one embodiment of a compact block structure 20 of a hearing aid with two actively driven antenna elements 23 and 24. The two actively driven antenna elements 23 and 24 are interconnected by a bridge element 29, and in operation the bridge element 29 transports a significant current between the two actively driven antenna elements 23 and 24.

The bridge segment 26 of the parasitic element provides an electrical connection between the two main segments 25 of the parasitic element. When coupling the two driven antenna elements 23 and 24 to the parasitic element 25, 26, the coupling may advantageously take place along an edge transporting a significant current. For the embodiment shown in FIG. 6, the coupling the two driven antenna elements 23 and 24 to the parasitic element 25, 26 takes place between the bridge element 29 and the bridge segment 26. Mutual inductance occurs in a section 28 when the change in current in one inductor induces a voltage in another nearby inductor.

Figure 7:
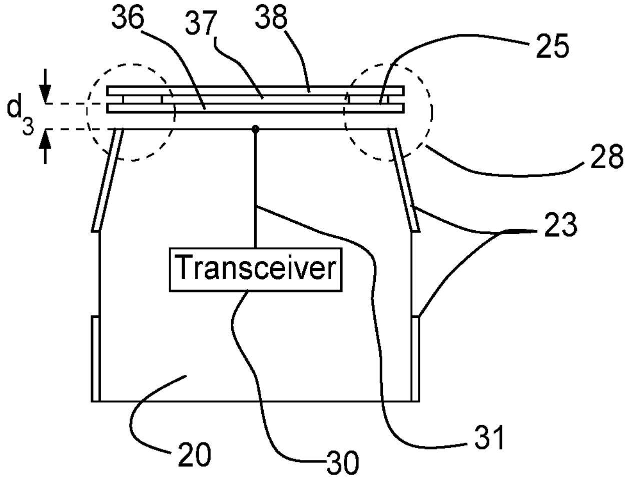
FIG. 7 illustrates in cross section a further embodiment of a compact block structure of a hear aid with actively driven antenna elements and a parasitic element according to the invention.

FIG. 7 illustrates in cross section of a compact block structure 20 of a hear aid 10 with actively driven antenna elements 23 and 24 and a parasitic element 25, 26 according to one embodiment of the invention. The transceiver 30 drives the two actively driven antenna elements 23 and 24 via the feed line 31. In this embodiment, the U-shaped parasitic element 25, 26 is manufactured embedded in a flex-print in a sandwich structure with the conducting U-shaped parasitic element 25, 26 arranged in a filler layer 37 between two isolating layers 36 and 38. In some embodiment the isolating layer 36 carries the conducting U-shaped parasitic element 25, 26, while filler layer 37 and the isolating layer 38 is omitted.

It is important is that the parasitic element 25, 26 extending along the at least one actively driven antenna element 23, 24. Preferably, the coupling between the parasitic element 25, 26 and the at least one actively driven antenna element 23, 24 is provided by mutual induction. Mutual induction occurs when a part of the parasitic element 25, 26 and extends closely along a part of the actively driven antenna element 23, 24 carrying a significant current. The parasitic element 25, 26 is electrically isolated from the at least one actively driven antenna element 23, 24.

The invention claimed is:

1. A hearing assistance device comprising:

a housing component (32, 33) enclosing processing circuitry arranged in a compact block structure (20);

at least one actively driven antenna element (23, 24) arranged in between the compact block structure (20) and the housing component (32, 33); and a parasitic element (25, 26) extending along an edge of the at least one actively driven antenna element (23, 24) transporting a significant current compared to other parts of the at least one actively driven antenna element;

wherein the parasitic element (25, 26) is electrically isolated from the at least one actively driven antenna element (23, 24);

wherein the parasitic element is embedded in the housing component; and wherein the parasitic element is a U-shape metal rod embedded into the housing component during manufacturing by an injection molding process chosen from an over-molding process or an insertion molding process.

2. The hearing assistance device according to claim 1, wherein the at least one actively driven antenna element (23, 24) comprises two actively driven antenna elements (23, 24), a first actively driven antenna element (23, 24) facing towards the hearing aid user during normal use, and a second actively driven antenna element (23, 24) facing away from the hearing aid user during normal use.

3. The hearing assistance device according to claim 1, wherein the at least one actively driven antenna element (23, 24) is provided as resonant loop antennas adapted to operate at an ISM band at approximately 2.4 GHz.

4. The hearing assistance device according to claim 1, wherein the at least one actively driven antenna element (23, 24) is a half-wave dipole.

5. The hearing assistance device according to claim 1, wherein the parasitic element (25, 26) is configured as a director having a resonance frequency being 1-10% higher than a resonance frequency of the at least one actively driven antenna element (23, 24).

6. The hearing assistance device according to claim 1, wherein the parasitic element (25, 26) is configured as a reflector having a resonance frequency being 1-10% lower than a resonance frequency of the at least one actively driven antenna element (23, 24).

7. The hearing assistance device according to claim 2, wherein the parasitic element (25, 26) is U-shaped and has two main segments (25) extending in parallel with each other and a bridge segment (26) connecting the two main segments (25).

8. The hearing assistance device according to claim 1, wherein the parasitic element (25, 26) is embedded in a flex print board (36-38) extending along edges of the at least one actively driven antenna element (23, 24) mounted on the compact block structure (20).

9. The hearing assistance device according to claim 7, wherein the at least one actively driven antenna element are two driven antenna elements (23, 24) extending along with a respective one of the two main segments (25) of the parasitic element (25, 26), and wherein a spacing between one of the actively driven active elements (23, 24) and one of the two main segments (25) of the parasitic element (25, 26) in a mutual inductance section (28) is in the range from 0.5 to 5% of the wavelength at which the actively driven active elements (23, 24) resonates.

10. The hearing assistance device according to claim 1, wherein the at least one actively driven antenna element are two driven antenna elements (23, 24) extending along with a respective one of the two main segments (25) of the parasitic element (25, 26), and wherein one of the actively driven active elements (23, 24) interacts with one of the two main segments (25) of the parasitic element (25, 26) in a mutual inductance section (28), and wherein a length of the mutual inductance section (28) is in the range from 8 to 25% of the wavelength at which the antenna resonates.

11. The hearing assistance device according to claim 1, wherein the parasitic element (25, 26) is a U-shaped parasitic element (25, 26) manufactured by adding a metallic pattern to the housing component in a Laser Direct Structuring (LDS) process, and subsequently cover the metallic pattern by an insulating layer (34).

12. A method of manufacturing a hearing assistance device comprising steps of:

enclosing a compact block structure containing processing circuitry of the device in a housing component;

arranging at least one actively driven antenna element in between the compact block structure and the housing component; and mounting the housing component so a parasitic element is extending along an edge of the at least one actively driven antenna element transporting a significant current compared to other parts of the at least one actively driven antenna element and is electrically isolated from the at least one actively driven antenna element; and wherein the method further comprises embedding a U-shape metal rod into the housing component during the manufacturing by an injection molding process chosen from an over-molding process or an insertion molding process.

13. The method according to claim 12 and comprising providing a mutual inductance section with a narrow a spacing between one of the actively driven active elements and one of two main segments of the parasitic element, wherein the spacing is in the range from 0.5 to 5% of the wavelength at which the actively driven active elements resonates.

14. The method according to claim 12 and comprising providing a mutual inductance section with a narrow a spacing between one of the actively driven active elements and one of two main segments of the parasitic element, wherein a length of the mutual inductance section is in the range from 8 to 25% of the wavelength at which the antenna resonates.

15. The method according to claim 12 and comprising embedding the parasitic element into the housing component.

16. The method according to claim 12 and comprising embedding a U-shaped parasitic element during manufacturing by adding a metallic pattern to the housing component in a Laser Direct Structuring (LDS) process, and subsequently cover the metallic pattern by an insulating layer.

17. A hearing assistance device comprising:

a housing component enclosing processing circuitry arranged in a compact block structure;

at least one actively driven antenna element arranged in between the compact block structure and the housing component; and a parasitic element extending along at least a part of the at least one actively driven antenna element;

wherein the parasitic element is electrically isolated from the at least one actively driven antenna element;

wherein the parasitic element is embedded in the housing component; and wherein the parasitic element is a U-shape metal rod embedded into the housing component during the manufacturing by means of an injection molding process chosen from an over-molding process or an insertion molding process.

* * * * *